Dec. 22, 1970     J. PÜRRER ET AL     3,548,580

RAKE CONSTRUCTION FOR HAYMAKING MACHINE

Filed March 25, 1968

Josef Pürrer
Albert Krauss
Inventors.

By Karl J. Ross
Attorney

United States Patent Office 3,548,580
Patented Dec. 22, 1970

3,548,580
RAKE CONSTRUCTION FOR HAYMAKING MACHINE
Josef Pürrer and Albert Krauss, Gottmadingen, Germany, assignors to Maschinenfabrik Fahr AG., Gottmadingen, Germany, a corporation of Germany
Filed Mar. 25, 1968, Ser. No. 715,649
Claims priority, application Germany, Apr. 3, 1967, M 58,386
Int. Cl. A01d 79/02
U.S. Cl. 56—400        5 Claims

ABSTRACT OF THE DISCLOSURE

A two-pronged rake formed from coiled wire is clamped to an extremity of a rotating arm between that extremity and a saddle-shaped block, the latter having two rounded humps engaging a looped central portion of the wire which is curved about a transverse horizontal axis to fit the shape of the humps. To change the angle of inclination of the prongs, the clamping force is released so that the rake may be swung about the axis to the desired extent, or the block is replaced by a block of different shape.

---

Our present invention relates to a rake assembly for an agricultural machine, such as a haymaking machine with a set of rotary rakes as disclosed in common assigned applications Ser. No. 562,710 filed July 5, 1966 by G. G. Chombart, and Ser. No. 577,335, filed Sept. 6, 1966 by M. Stampfer; see also British Pat. No. 911,782.

The rake members of such rotary assemblies usually consist of lengths of stiff wire bent back upon themselves to form pairs of prongs depending from the free extremities of respective supporting arms extending generally radially from the axis of rotation. Since these wires are subject to breakage or objectionable deformation, they are generally clamped to the arms for quick release and replacement. The manner of clamping hitherto employed, however, did not allow for conveniently changing the angle of inclination of the prongs, as is frequently necessary when the machine is to be used for different kinds of operations, e.g. for piling spread crop materials into windrows or for tedding the stalks thus piled up. Different types of crops also often call for different angles of attack.

The general object of our present invention, therefore, is to provide a rake construction, particularly but not exclusively for rotary assemblies of the character referred to, in which a given rake member may be adjustably mounted so that its angle of inclination may be carried at will, within certain limits.

A more particular object is to provide means in such construction for positively retaining the rake member in a selected angular position.

The foregoing objects are realized, pursuant to our invention, by the provision of a block with at least one and preferably two curved humps serving to clamp a correspondingly curved portion of the rake wire between this block and the free extremity of the associated supporting arm, the wire portion so clamped lying in a substantially cylindrical surface centered on the axis of the hump or humps. Advantageously, this curved wire portion is looped about a central boss of the clamping block which has a saddle-shaped ramp forming the two humps, this arrangement being particularly useful when the rake member has two prongs interconnected by the curved portion. To increase the resiliency of these prongs, the wire is preferably coiled into one or more pairs of turns, centered on the generally horizontal axis of curvature of the intermediate wire portion, between that portion and the respective prongs.

The invention will be described in greater detail with reference to the accompanying drawing in which.

Figures 3, 4:
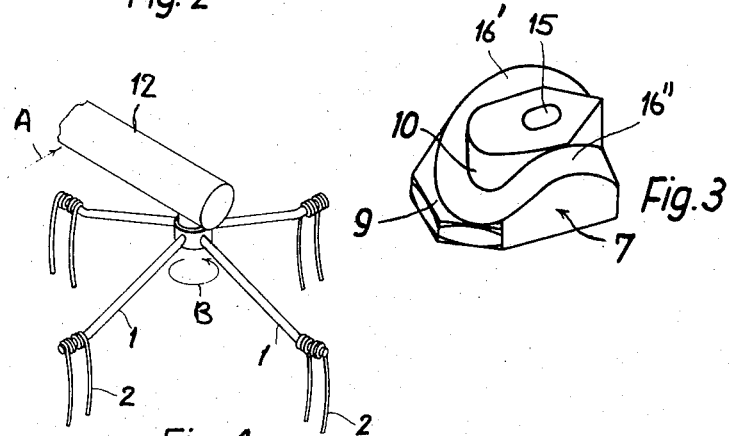
FIG. 3 is a perspective view of an element of the assembly, drawn to a larger scale.
FIG. 4 shows a rake wheel incorporating the structure of FIGS. 1–3.

Reference will be first made to FIG. 4 showing part of the frame 12 of a haymaking machine having a number of rotary rakes 13 (only one shown) attached thereto. Each of these rotary rakes has the form of a star wheel with four generally radial arms 1 and with two-pronged rake members 2 depending from the free ends of these arms. As the machine advances in the direction of arrow A, each rake 13 is rotated about a substantially vertical axis (arrow B) by suitable transmission means from an associated power-take-off shaft not shown.

Figure 1:
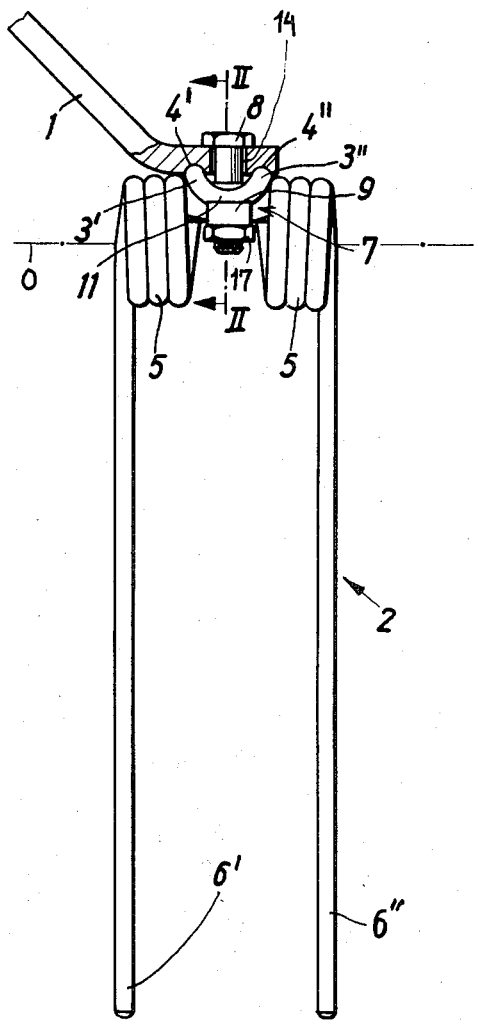
FIG. 1 is a front view, partly in section, of a rake construction according to the invention.
Figure 2:
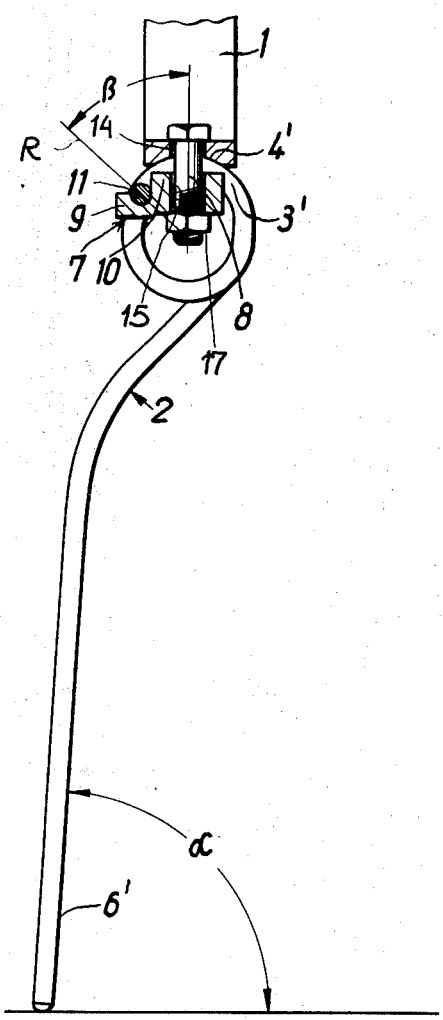
FIG. 2 is a sectional view taken on the line II—II of FIG. 1.

The construction of each rake member 2 is illustrated in FIGS. 1 and 2 wherein an extremity of the associated arm 1, shown as a flat strip of generally rectangular profile, is seen formed with a bore 14 traversed by a mounting bolt 8 which also passes through a bore 15 of a clamping block 7 shown in greater detail in FIG. 3. Block 7 has a saddle-shaped ramp forming two humps 16', 16'' on opposite sides of a central boss 10 which is provided with the bolt aperture 15 and, as shown, rises substantially to the level of these humps. A ledge 9, offset from the humps 16', 16'', adjoins the depressed middle section of the ramp.

The extremity of arm 1 overlying the block 7 is provided on its underside with a pair of grooves 4', 4'' of semi-circular cross-section. These grooves accommodate the upper half of the profile of a length of stiff wire whose ends form the prongs 6', 6'' of rake member 2 and which is bent at its center into a U-shaped loop lying in a cylindrical surface centered on a horizontal axis O. The arms 3', 3'' of the "U" are received in the bottom grooves 4', 4'' of supporting arm 1 while the bight portion 11 of the "U" rests against the ledge 9 of block 7. Two multiturn coils 5', 5'' also centered on axis O, lie between the prongs 6', 6'' and the looped central wire portion 3', 11, 3''. Thus, the wire constituting the rake member 2 is bent back upon itself to form the two symmetrical halves 3', 5', 6' and 3'', 5'', 6'' thereof on opposite sides of bight portion 11.

With the looped wire portion clamped tightly between the supporting arm 1 and the block 7 by a nut 17 engaging the bolt 8, the rake member 2 is immobilized in a position in which its bight portion 11 rests in a recess of ledge 9 so as to lie on a radius R (extending from the axis O) which includes an angle $\beta$ with the vertical. This angle $\beta$ determines the angle of inclination $\alpha$ included between the prongs 6', 6'' and the ground. For any particular block 7 the angles $\alpha$ and $\beta$ are uniquely determined; in order to change the angle of inclination, therefore, it is merely necessary to replace the block 7 by a similar block of suitably modified shape.

If the ledge 9 of block 7 were omitted, the position of bight portion 11 would no longer be positively defined and an adjustment of angle $\alpha$ could be made by simply loosening the nut 17 and rotating the curved loop 3', 11, 3'' about the axis O into the desired new position. In that case, however, the angle of inclination would have to be measured upon any such readjustment.

It will be noted that the width of the strip-like arm 1 somewhat exceeds that of the flat top of boss 10 whereby this arm slightly overhangs the central part of bight portion 11 to help maintain the latter in contact with the ledge 9.

We claim:

1. A rake assembly for an agricultural machine, comprising a supporting arm having a free extremity; a rake member of stiff wire having a pair of ends shaped into prongs depending from said extremity and an intermediate portion integral with said prongs curved about a generally horizontal axis; a generally saddle-shaped block provided with an upstanding boss and with a ramp embracing said boss on three sides, said ramp forming a pair of humps on opposite sides of said boss and a depressed central ledge, said intermediate portion having a central part resting on said ledge and a pair of upwardly convex loops curved around said humps; and clamping means securing said block from below to said extremity with the latter bearing downwardly upon said loops to maintain said central part in contact with said ramp in the region of said ledge.

2. An assembly as defined in claim 1 wherein said boss has a flat top, said extremity being a strip of a width at least equal to that of said boss.

3. An assembly as defined in claim 2 wherein said strip has a grooved underside partly receiving said loops, said humps being substantially level with the top of said boss.

4. An assembly as defined in claim 2 wherein said boss and said strip are provided with aligned holes, said clamping means including a bolt traversing said holes.

5. An assembly as defined in claim 1 wherein said rake member is coiled between said prongs and said intermediate portion into at least one pair of symmetrical turns centered on said axis.

References Cited

UNITED STATES PATENTS

| | | | |
|---|---|---|---|
| 2,607,182 | 8/1952 | Hill | 56—400 |
| 2,657,521 | 11/1953 | Happe | 56—400 |
| 2,722,799 | 11/1955 | Cooley | 56—400 |
| 2,938,324 | 5/1960 | Rosenberg | 56—400 |
| 3,171,243 | 3/1965 | Johnston | 56—400 |

ANTONIO F. GUIDA, Primary Examiner